United States Patent
Corghi et al.

(10) Patent No.: US 7,201,204 B2
(45) Date of Patent: Apr. 10, 2007

(54) SELF-CENTERING UNIT

(75) Inventors: Remo Corghi, Correggio (IT); Enrico Santoro, Casalecchio Di Reno (IT)

(73) Assignee: Corghi S.p.A., Correggio (Reggio Emilia) (IT)

( * ) Notice: Subject to any disclaimer, the term of this patent is extended or adjusted under 35 U.S.C. 154(b) by 9 days.

(21) Appl. No.: 10/698,359

(22) Filed: Nov. 3, 2003

(65) Prior Publication Data

US 2005/0067115 A1 Mar. 31, 2005

(30) Foreign Application Priority Data

Sep. 29, 2003 (IT) .......................... RE2003A0089

(51) Int. Cl.
*B60C 25/00* (2006.01)
(52) U.S. Cl. .......................... 157/16; 157/21; 269/107
(58) Field of Classification Search ............ 157/16–18, 157/21, 1.24, 14; 269/203–206, 107, 111, 269/112, 115–120

See application file for complete search history.

(56) References Cited

U.S. PATENT DOCUMENTS

| | | | | | |
|---|---|---|---|---|---|
| 3,156,480 | A | * | 11/1964 | Wuesthoff | 269/107 |
| 3,923,090 | A | * | 12/1975 | Kinney | 157/17 |
| 4,034,786 | A | * | 7/1977 | Feldmann et al. | 157/18 |
| 4,750,538 | A | * | 6/1988 | du Quesne | 157/16 |
| 4,884,611 | A | * | 12/1989 | Schmidt | 157/1.24 |
| 6,039,104 | A | | 3/2000 | Cunningham et al. | |
| 6,062,289 | A | * | 5/2000 | Cunningham et al. | 157/16 |

* cited by examiner

*Primary Examiner*—Hadi Shakeri
(74) *Attorney, Agent, or Firm*—Browdy and Neimark, PLLC

(57) ABSTRACT

Self-centering unit for tire removal machines, comprising a plate provided with a series of angularly equidistant radial slots, in each of which a clamping jaw is received and slides to grip the edge of a wheel rim, said clamping jaws being linked together in such a manner as to be always equidistant from the axis of said plate, at least one clamping jaw being associated with actuator means causing it to translate in a radial direction by means of a positioner device arranged to vary the working position of said clamping jaws relative to the actuator means, without modifying their travel stroke.

7 Claims, 10 Drawing Sheets

SELF-CENTERING UNIT

FIELD OF THE INVENTION

The present patent relates to a self-centering unit to be associated with tire removal machines, to maintain wheel rims locked in a horizontal position while demounting and/or mounting the corresponding tires.

PRIOR ART

The automobile industry currently markets vehicles provided with wheel rims of a diameter which exceeds the range within which traditional self-centering units operate.

To be able to also operate on large-dimension wheel rims, a self-centering unit is known comprising a horizontal plate mounted on an underlying vertical shaft of the tire removal machine. Said plate presents a circumferential series of angularly equidistant radial slots, with each of which there is associated a slide carrying a head or clamping jaw for gripping the edge of the wheel rim from the inside or outside.

The head is associated with the slide in such a manner as to be able to translate in the direction of the travel axis of the slide in order to occupy two different operative positions, locking means being present to lock the head in the chosen operative position.

Although the described device performs the function for which it is provided, it presents certain drawbacks. A first drawback is the need to individually move each head relative to the slide to adapt the self-centering unit to large-dimension wheel rims. This operation is lengthy and laborious, the operator often forgetting to move a head, with the result that when the wheel rim is gripped by the heads it is not in the correct working position and risks undergoing damage.

SUMMARY OF THE INVENTION

The object of the present invention is to overcome the drawbacks of the known art within the context of a simple and rational solution.

The invention achieves said object by virtue of the characteristics defined in the claims.

Specifically, the invention provides a self-centering unit comprising a plate provided with a series of angularly equidistant radial slots, in each of which a clamping jaw is received and slides to grip the edge of a wheel rim, said clamping jaws being linked together in such a manner as to be always equidistant from the axis of said plate, at least one clamping jaw being associated with actuator means for translating it in a radial direction. According to the invention, between said at least one clamping jaw and said actuator means there is provided a positioner device arranged to vary the working position of said clamping jaws relative to the actuator means, without modifying their travel stroke.

In a preferred embodiment of the invention, said actuator means are associated with two opposing clamping jaws, a positioner device being interposed between each clamping jaw and the actuator means. According to the invention, said actuator means for translating the clamping jaws are at least one pneumatic cylinder-piston unit.

The characteristics and constructional merits of the invention will be apparent from the ensuing detailed description given with reference to the figures of the accompanying drawings, which illustrate a particular preferred embodiment thereof by way of non-limiting example.

DESCRIPTION OF THE PREFERRED EMBODIMENT

Said figures show a self-centering unit 1 comprising a horizontal plate 2 to be associated with a vertical shaft 3 branching from the base of a usual tire removal machine, not shown.

The purpose of the shaft 3 is to rotate the self-centering unit 1 during the demounting or mounting of the tire from or on the wheel rim by the usual means with which the tire removal machine is provided.

Figure 1:
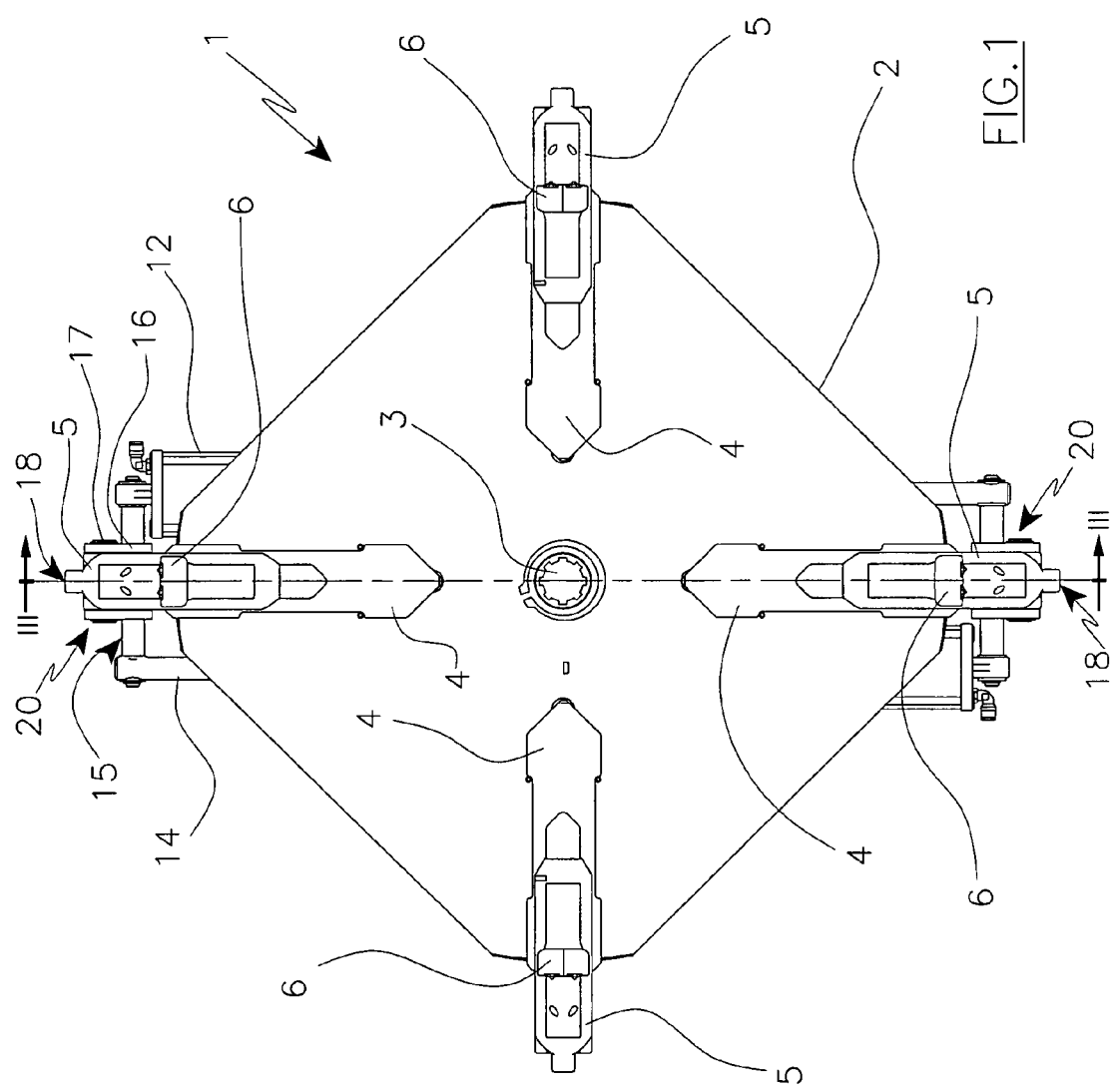
FIG. 1 is a plan view of the self-centering unit of the invention from above.

The plate 2 presents four angularly equidistant identical radial slots 4. In each slot 4 there is slidingly mounted a slide 5 (FIG. 1) provided on its upper side with a double acting clamping jaw 6, i.e. able to lock a wheel rim 7, shown by dashed and dotted lines in FIG. 3, from the inside or from the outside.

Figure 2:
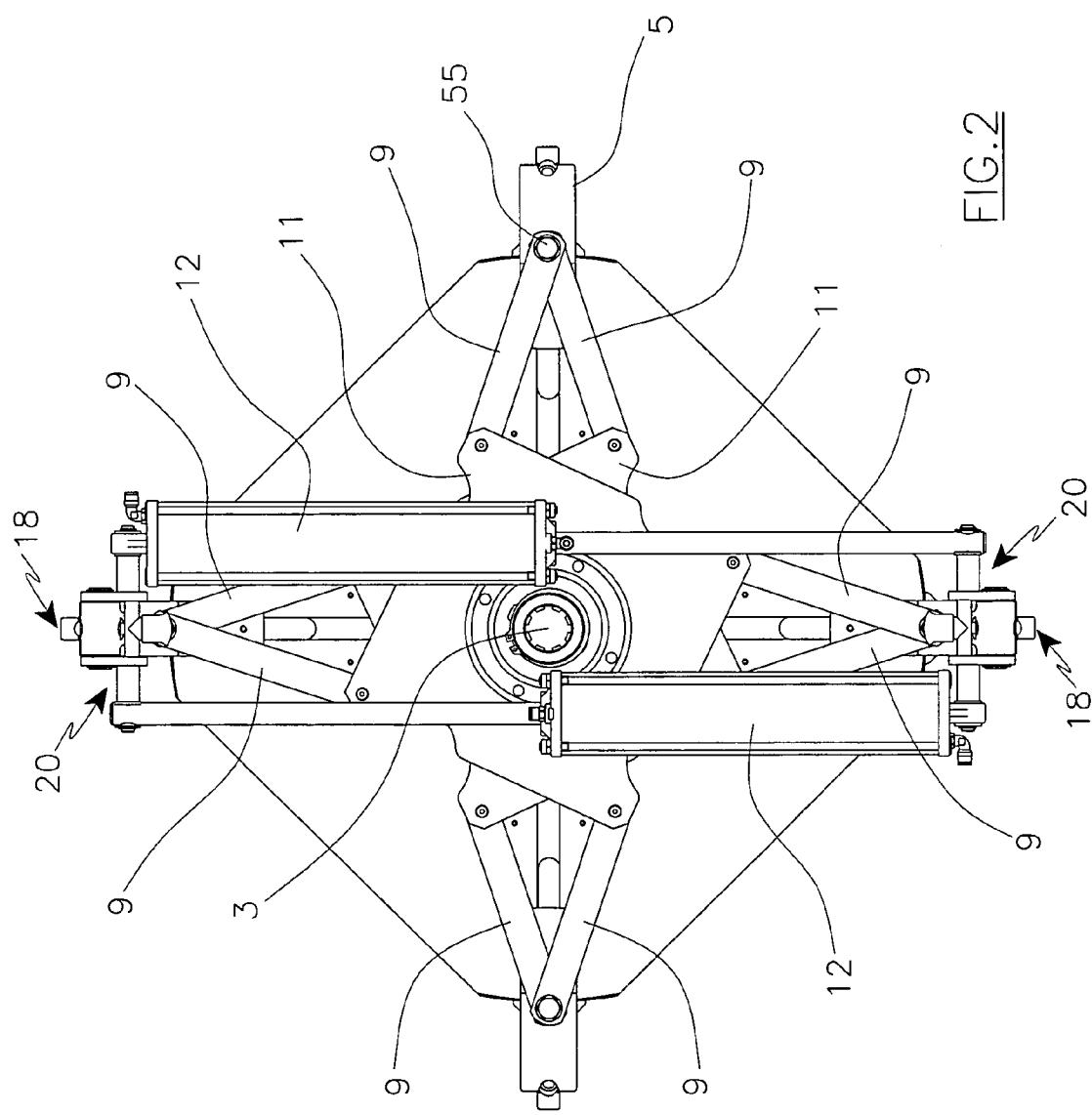
FIG. 2 is a plan view of the self-centering unit of the invention from below.
Figure 3:
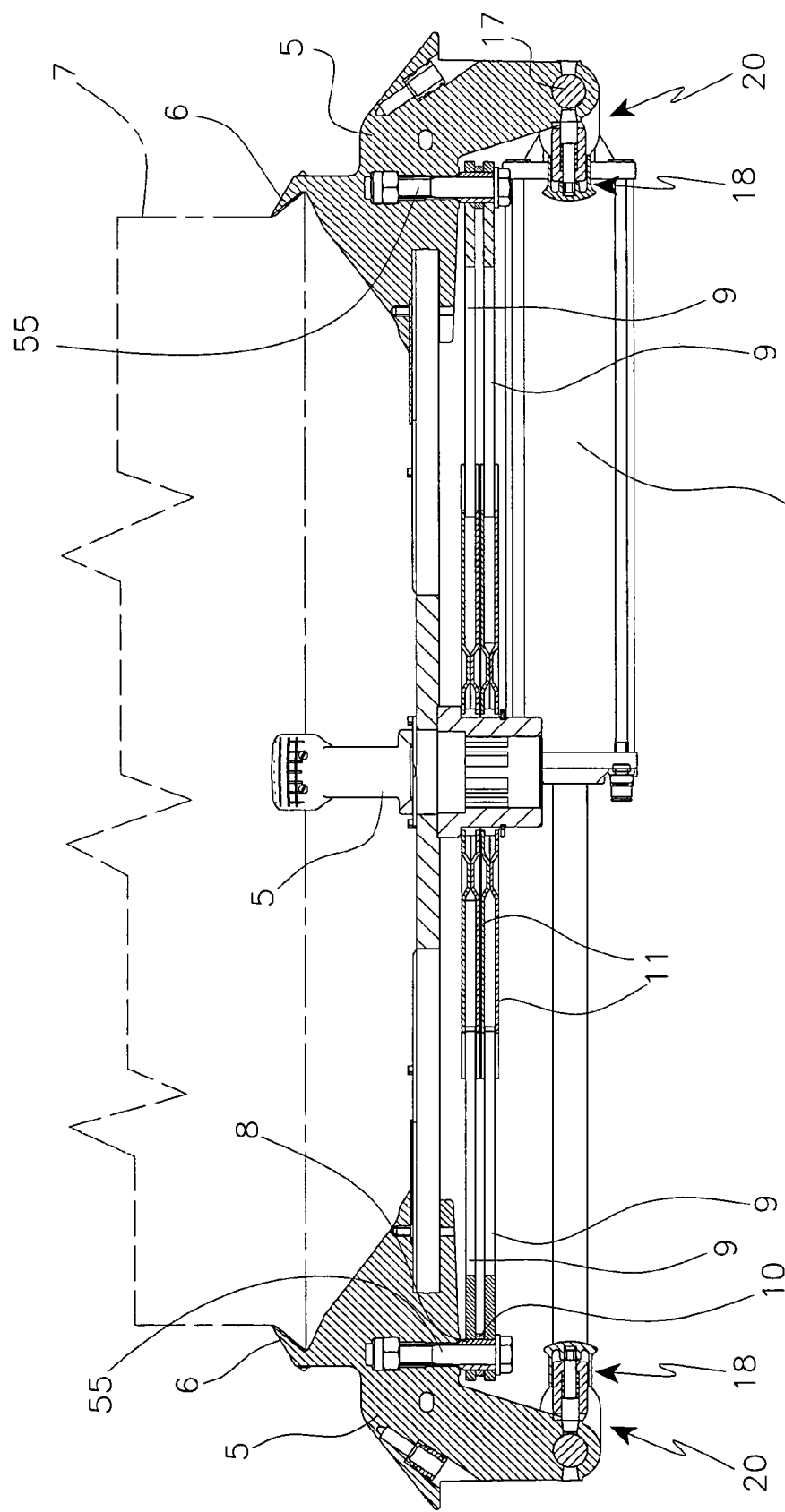
FIG. 3 shows the section III—III of FIG. 1.
Figure 4:
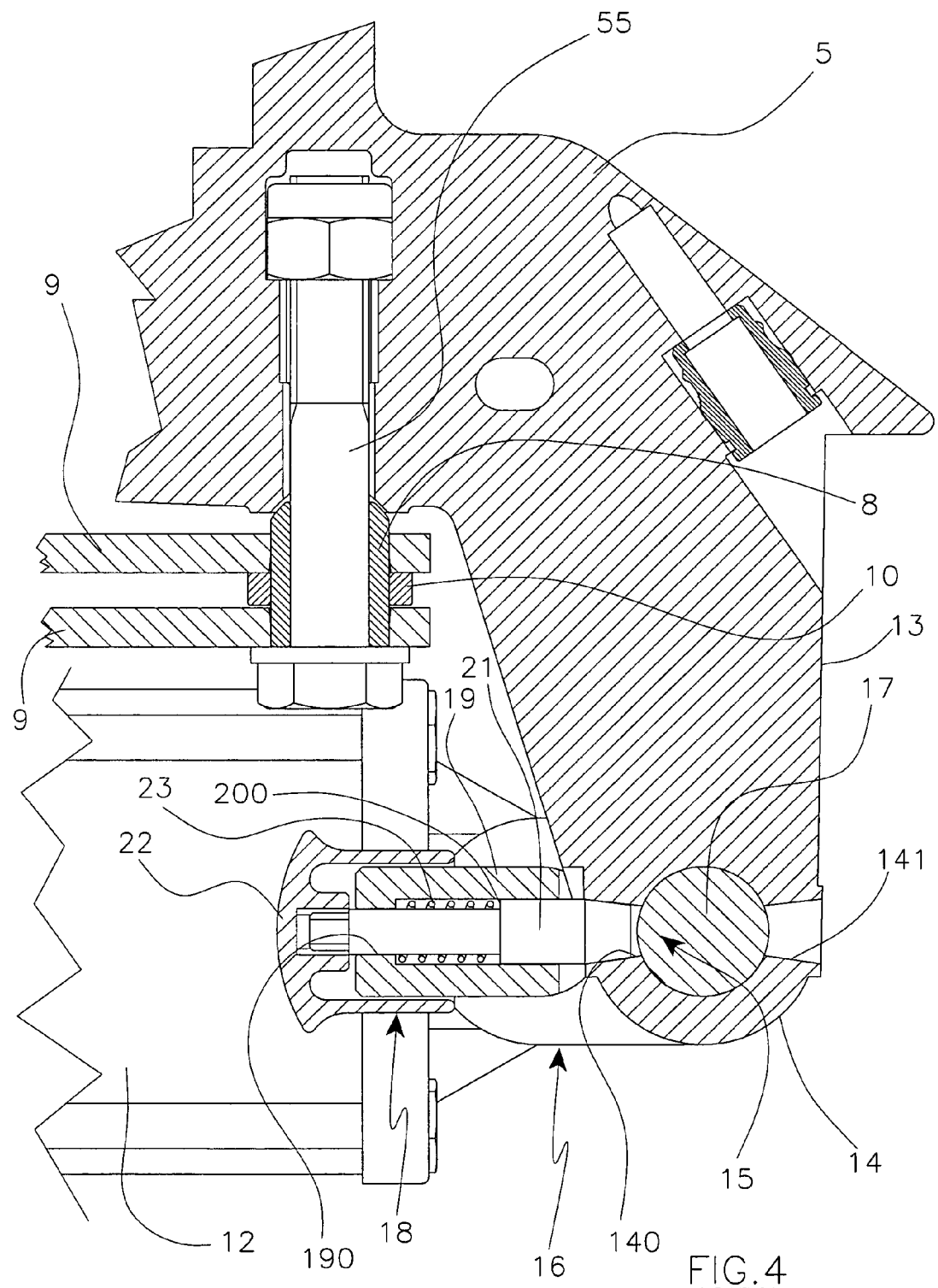
FIG. 4 is an enlarged-scale view of a detail of FIG. 3.

With reference to FIGS. 2, 3 and 4, each slide 5 lowerly presents a threaded pin 55 (FIG. 4), the axis of which intersects the longitudinal axis of the corresponding radial slot 4, and on which there is mounted a bushing 8 on which a pair of identical overlying connecting rods 9 are pivoted by way of an interposed spacer 10. The opposing ends of the connecting rods 9 are hinged to the corners of two identical overlying square plates 11 (FIG. 2) mounted idly on the shaft 3, so that the two connecting rods 9 of each pair are disposed symmetrical about the direction in which the corresponding clamping jaw 6 travels (FIG. 2). The function of the plates 11 and connecting rods 9 form linking means for linking together all the clamping jaws which grip the edge of the wheel rim 7 such that they are always equidistant from the axis of the shaft 3 of the tire removal machine.

Two opposing slides 5 are associated, via a positioner device 20, with two cylinder-piston units 12 disposed on one and the other side of the shaft 3, their function being to move the clamping jaws towards or away from the axis of the shaft 3, to hence cause the clamping jaws to translate radially.

Figure 5:
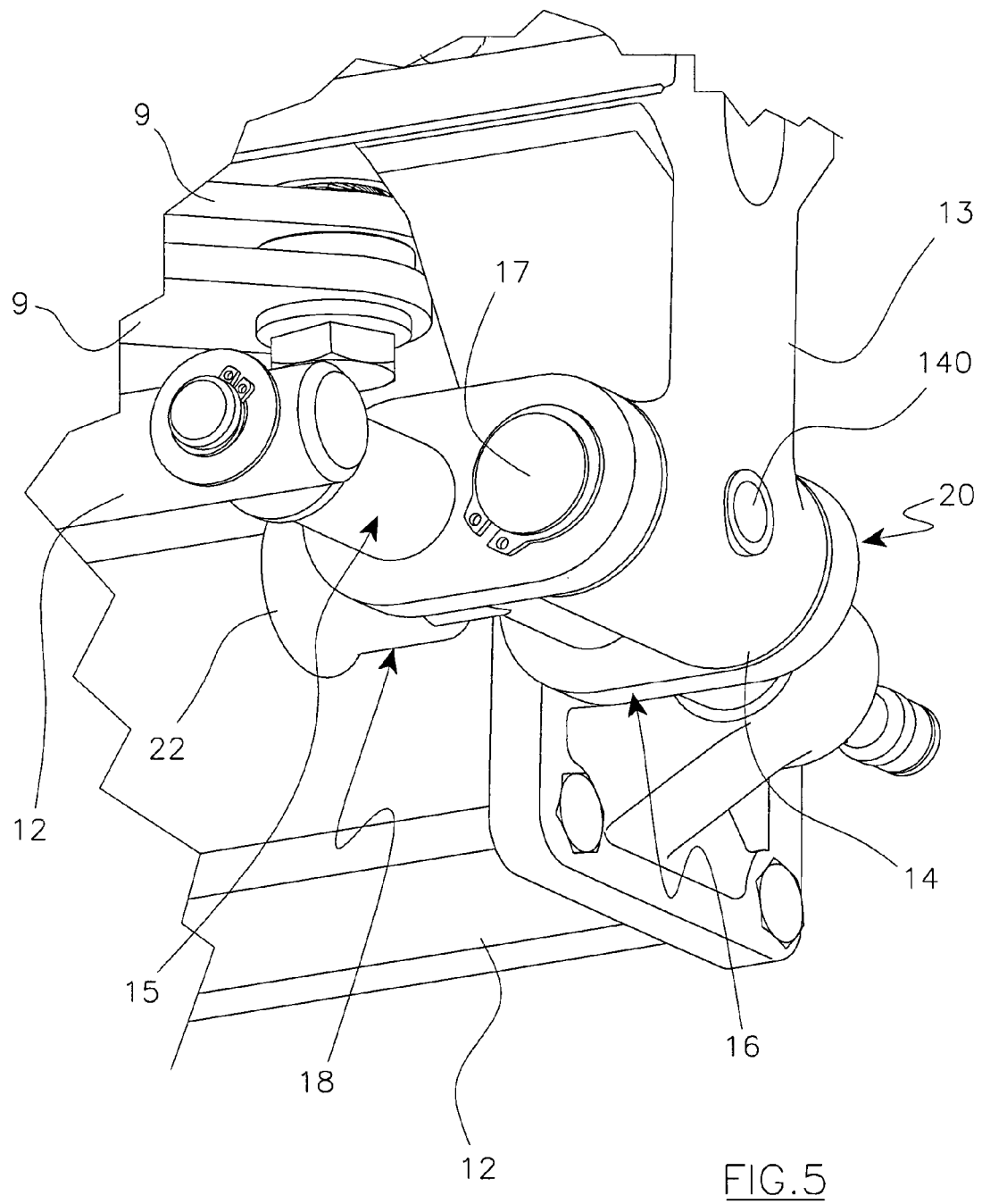
FIG. 5 is a three-dimensional view of part of a detail of the invention.
Figure 6:
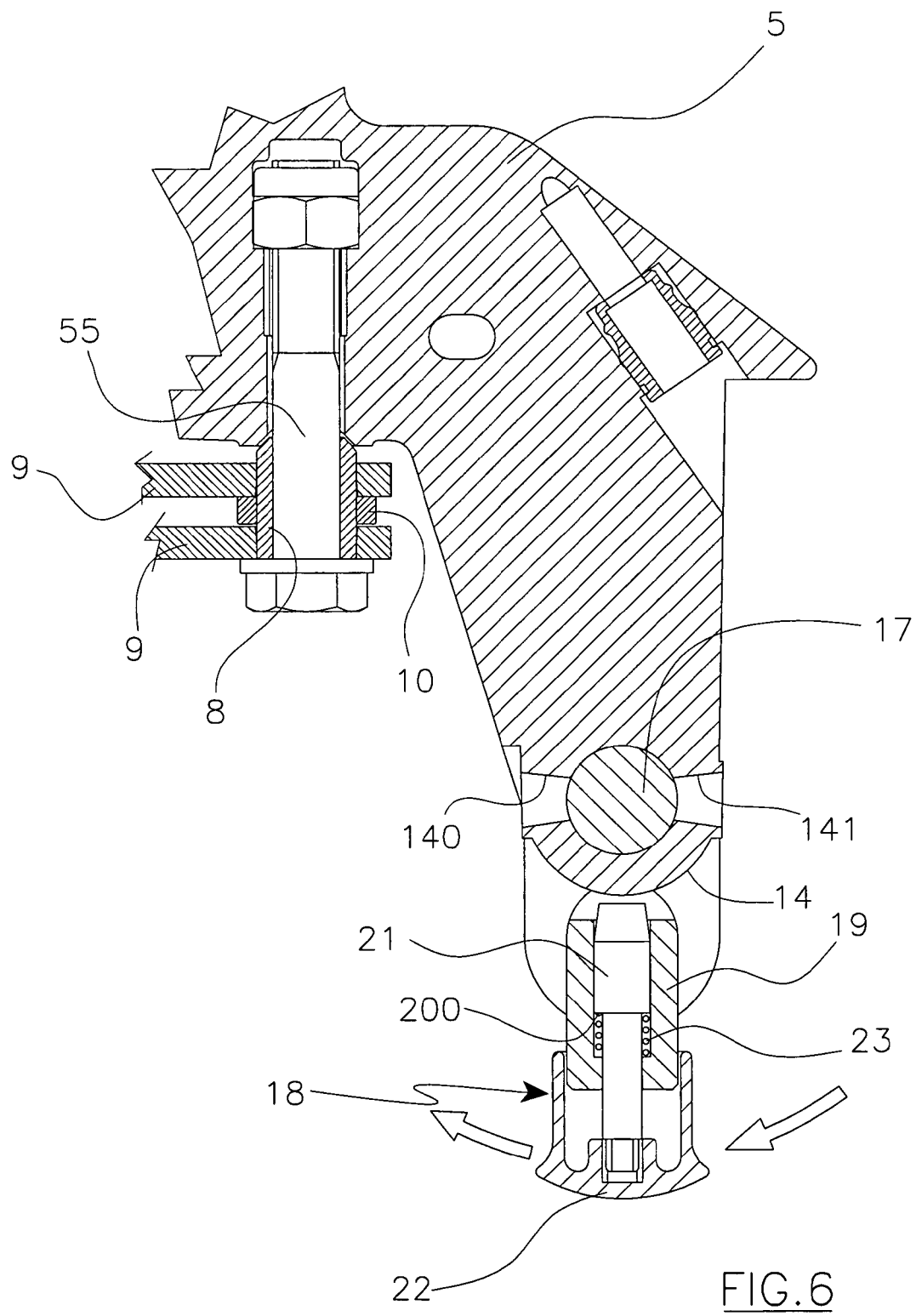
FIGS. 6 and 7 show the view of FIG. 4 in different operative stages.

Said two opposing slides 5 present lowerly (FIG. 5) a descending central stem 13 which terminates with a bushing 14 provided with two opposing holes 140 and 141 perpendicular to the axis of the bushing. The bushing 14 is connected to the said positioner device 20, which comprises a crankshaft 15 provided with a crank 16, on the crankpin 17 on which the bushing 14 is mounted. The ends of the crankshaft 15 are connected respectively to said pneumatic cylinder-piston units 12.

Rotating the crankshaft 15 causes the working position of the clamping jaws to vary, i.e. causes them to approach or withdraw from the axis of the shaft 3 without modifying the travel stroke of the clamping jaws. This advantageously enables the self-centering unit to operate even on large-dimension wheel rims, i.e. with diameters exceeding 20 inches.

The positioner device 20 also comprises means 18 for locking the crankshaft 17 in two opposing working positions, in which the clamping jaws are at their closest point to and farthest point from the shaft axis respectively.

With reference to FIG. 4, said means 18 are fixed between the arms of the crank 16, and comprise a cup-shaped body 19 the end of which is provided with a hole 190. Within the cup-shaped body 19 there slides a pin 21, one end of which is intended to be received in one of the holes 140 of the bush 14, whereas the opposite end emerges from the cup-shaped body via said hole 190 and is connected to an operating knob 22. The pin is maintained normally urged into one of the holes 140 by a spring 23 mounted about the pin and contained within the cup-shaped body. Said spring 23 is compressed between the end of the cup-shaped body and an annular shoulder 200 on the pin 21.

Figure 7:
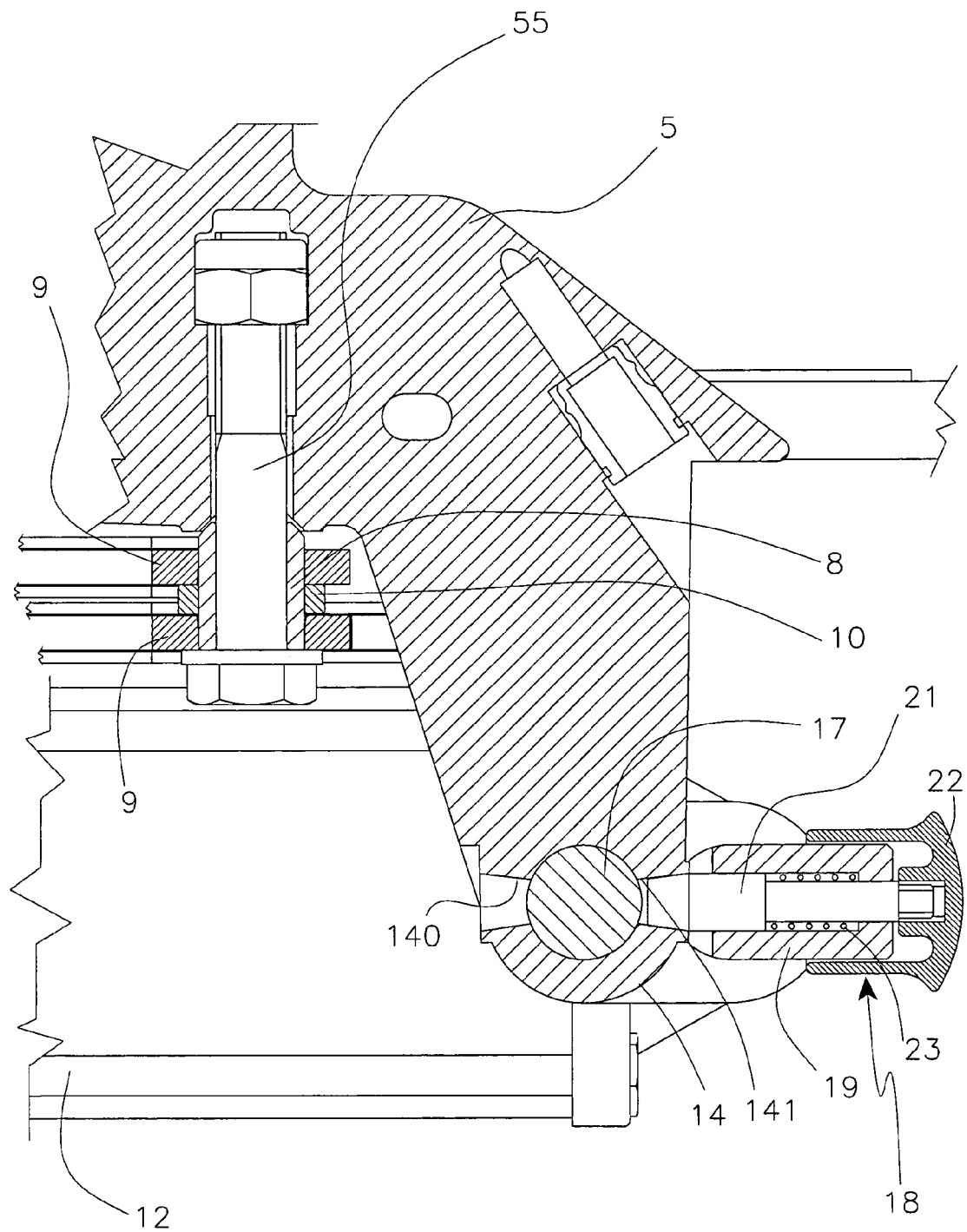
Figure 8:
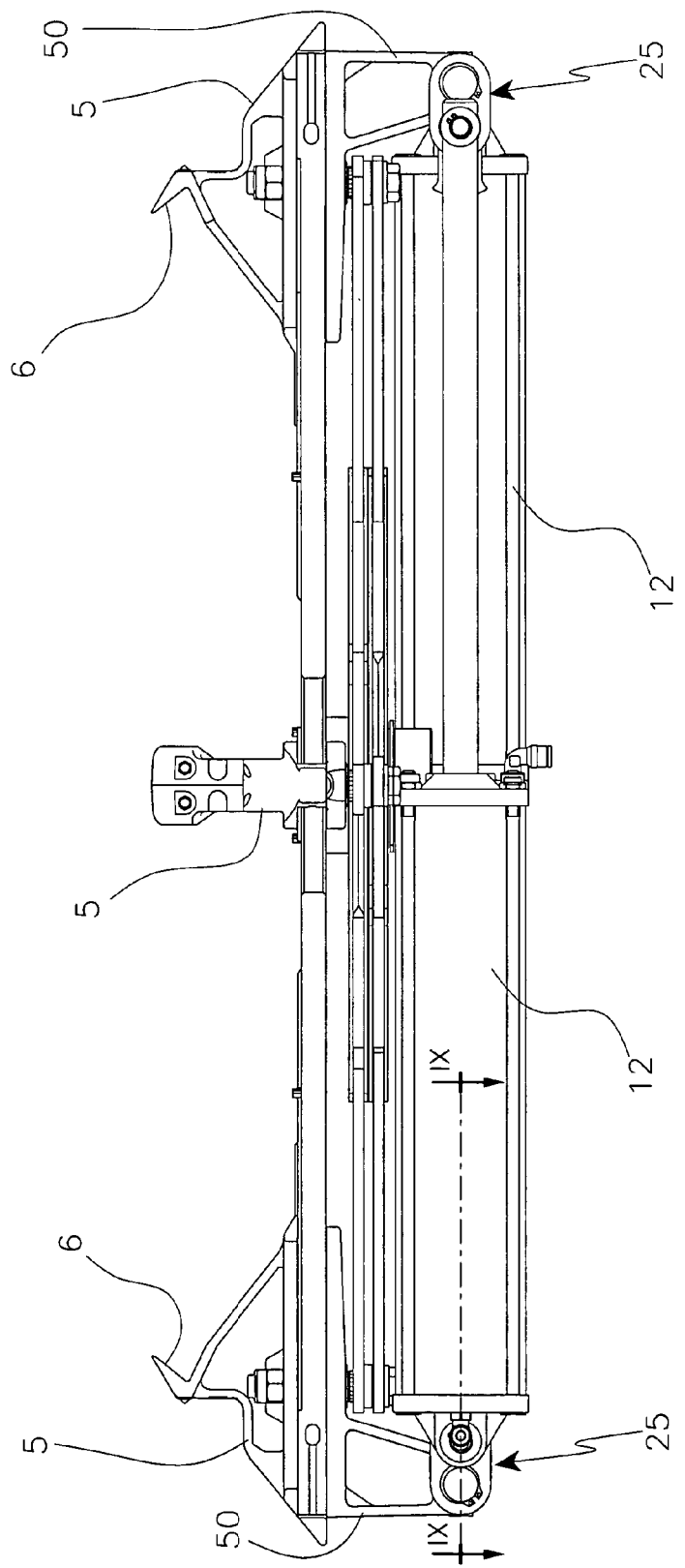
FIG. 8 is a side view of a variant according to the invention.

The operation of the invention is extremely simple. When the operator is to operate on large-dimension wheel rims, i.e. of diameter exceeding 20 inches, he sets the positioner device as shown in FIG. 3. To achieve this, starting from the position of FIG. 7 the operator extracts the pin 21 from the hole 141 and then rotates the crankshaft 15 through 180 degrees in a clockwise direction to bring the pin 21 in front of the hole 140. At this point, by releasing the knob the pin penetrates into the hole and locks the clamping jaw in position. It should be noted that this operation can be performed on only one or on both of the positioner devices, depending on the diameter of the wheel rim on which to operate.

FIGS. from 8 to 10 show a variant of the invention which differs from the aforedescribed embodiment with regard to the constructional form of the positioner device.

In the description of this variant of the invention, those components identical to and already described in the first embodiment of the invention are indicated by the same reference numerals.

Figure 9:
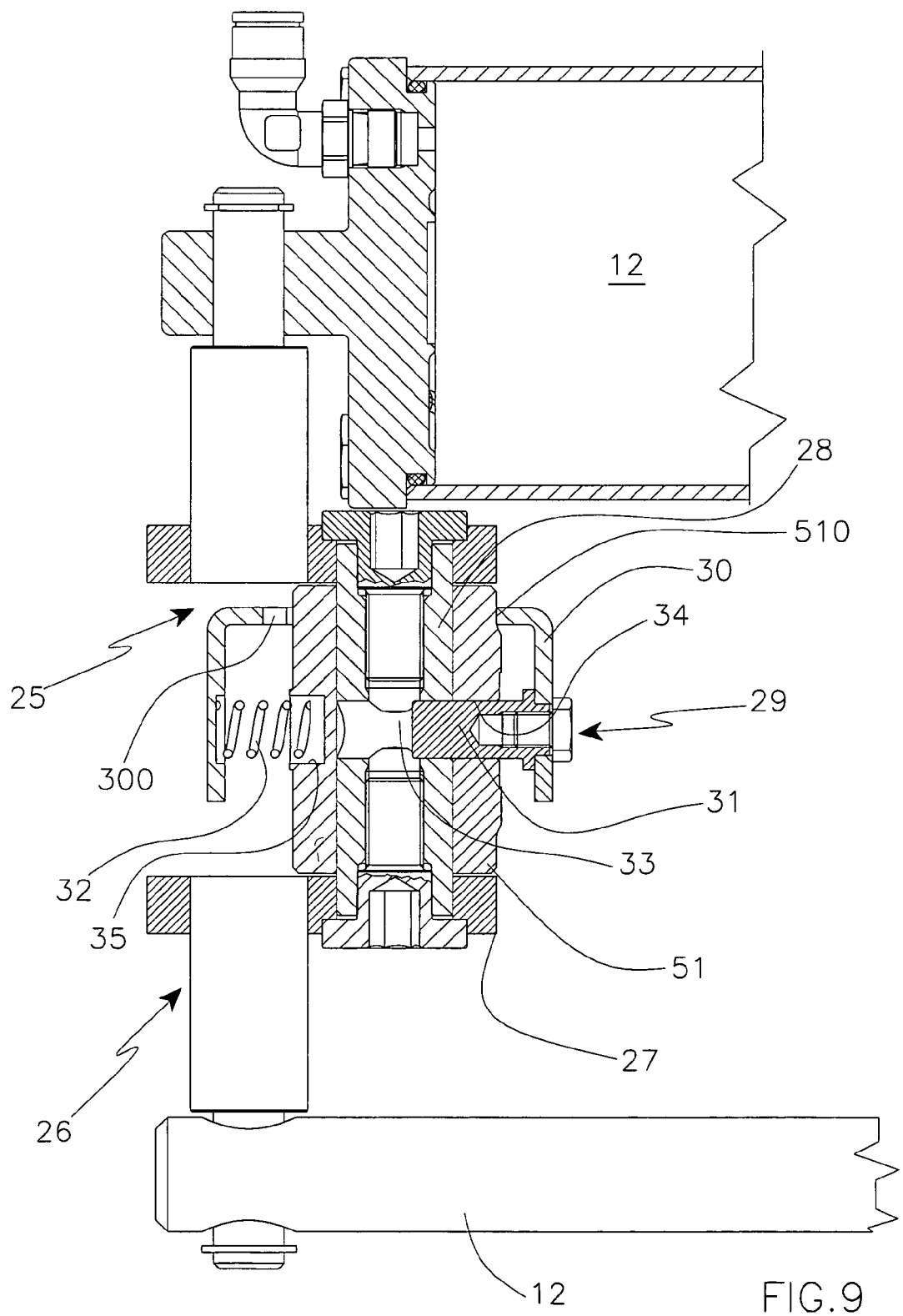
FIG. 9 is a detail along section line IX–??? of FIG. 8.
Figure 10:
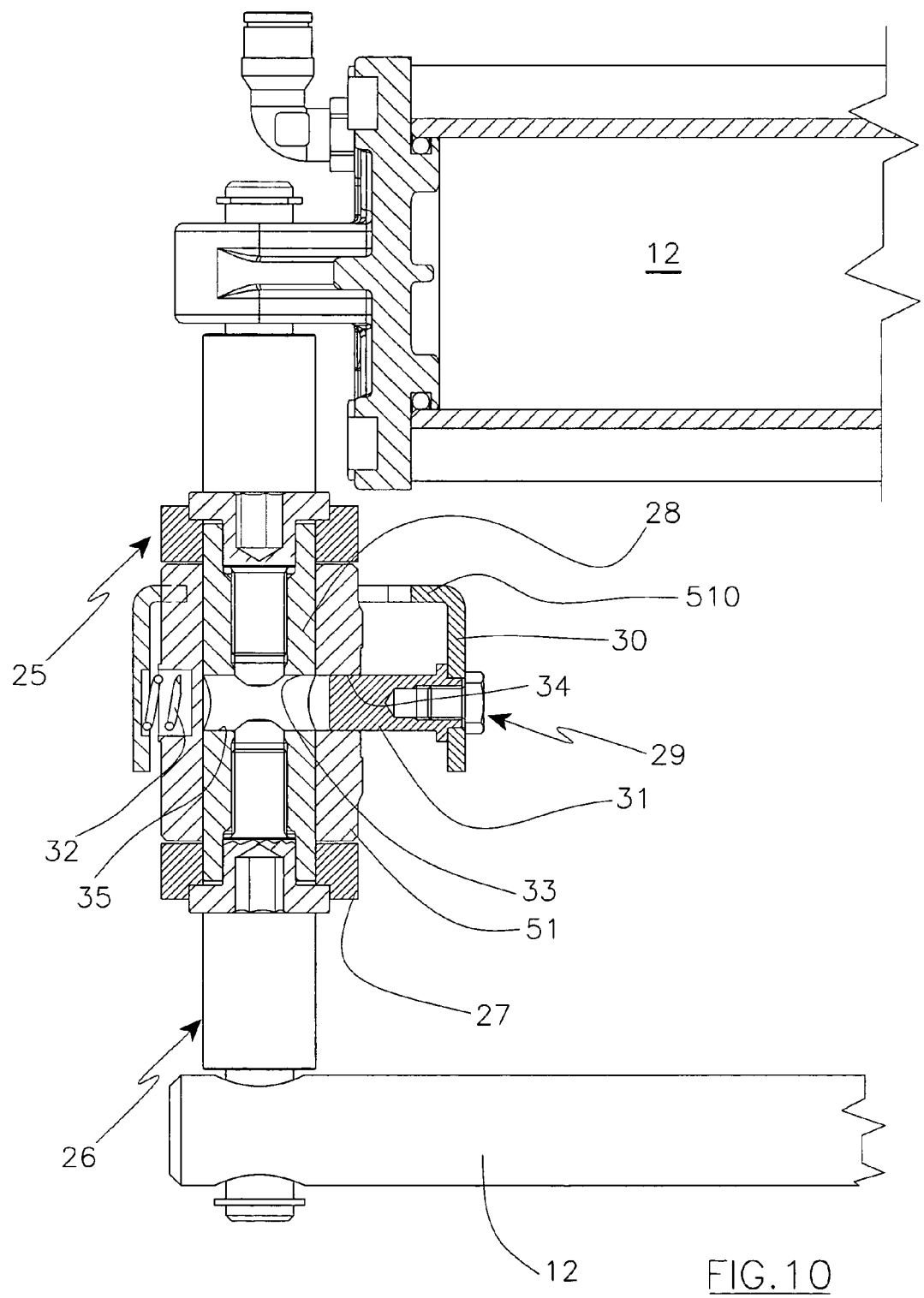
FIG. 10 is the detail of FIG. 9 in a different operative stage.

The figures show two opposing slides presenting at their rear a descending central stem 50 which terminates with a bushing 51 (FIG. 9) connected to the cylinder-piston units 12 via a positioner device 25.

The positioner device 25 comprises a crankshaft 26 provided with a crank 27, on the crankpin 28 of which the bushing 51 is mounted. The ends of the crankshaft 26 are connected respectively to said pneumatic cylinder-piston units 12.

Rotating the crankshaft 26 causes the working position of the clamping jaws to vary, i.e. causes them to approach or withdraw from the axis of the shaft 3 without modifying the travel stroke of the clamping jaws. This advantageously enables the self-centering unit to operate even on large-dimension wheel rims, i.e. with diameters exceeding 20 inches. The positioner device 25 also comprises means 29 for locking the crankshaft 26 in two opposing working positions, in which the clamping jaws are at their closest to and farthest from the shaft axis respectively.

Said locking means are associated with the bushing 51, they comprising a U-shaped latch 30, the base wall of which presents a rectangular aperture 300 to be received by and to translate on two flat portions 510 of the bushing 51. A pin 31 and a spring 32 are positioned in the arms of the latch 30. The pin 31 is normally received in a matching hole 33 in the crankpin 28 of the crank 27 by passing through a hole 34 in the bushing. The spring 32, the function of which is to maintain the pin 31 within the hole 33, is positioned between said arm of the latch 30 and a corresponding cavity 35 provided in the bushing wall.

Again in this case the operation of the invention is very simple. To position the device the operator moves the latch 30 against the action of the spring 32 so as to compress the spring 32 and hence cause the pin 31 to leave the hole 33. The operator then rotates the crankshaft 26 through 180 degrees and then releases the latch to cause the pin 31 to enter the hole 33 by the action of the spring 32.

What is claimed is:

1. A self-centering unit for tire removal machines, comprising a plate having a plurality of angularly equidistant radial slots therein and a clamping jaw in abutting engagement in each of said slots so as to slide in said slot and grip the edge of a wheel rim, said clamping jaws being directly linked together by linking means for moving all of said clamping jaws together always equidistant from the central axis of said plate, at least one of said clamping jaws being operably connected with an actuator which moves said linking means to translate each of said clamping jaws a same distance in a radial direction towards or away from the central axis of the plate, wherein a positioner device is interposed between said at least one of said clamping jaws and said actuator means, the positioner device being arranged to vary a working position of said at least one of said clamping jaws relative to the actuator without modifying the travel stroke of said clamping jaws, the positioner device comprising a crankshaft provided with a crank having a crankpin, said crankpin being received in a bushing rigid with said clamping jaw and the crank being connected to said actuator, and means for locking said crankshaft in different working positions.

2. The self-centering unit as claimed in claim 1, characterized in that said locking means are operably connected with said crankpin.

3. The self-centering unit as claimed in claim 1, characterized in that said locking means are operably connected with the bushing.

4. The self-centering unit as claimed in claim 1, characterized in that said bushing is provided with a lateral wall which presents at least two holes angularly spaced apart.

5. The unit as claimed in claim 4, characterized in that said pin is elastically maintained inserted in one of the holes present in said bushing by the action of a spring.

6. The self-centering unit as claimed in claim 1, characterized in that said means for locking said positioner device in position includes a pin.

7. The unit as claimed in claim 6, characterized in that said pin is elastically maintained in a hole present in the crankpin of the crankshaft by the action of a spring.

* * * * *